United States Patent [19]
Castner et al.

[11] Patent Number: 5,637,661
[45] Date of Patent: Jun. 10, 1997

[54] MOLECULAR WEIGHT REGULATOR FOR ANIONIC POLYMERIZATIONS

[75] Inventors: Kenneth F. Castner, Uniontown; Jean S. Clites, North Canton, both of Ohio

[73] Assignee: The Goodyear Tire & Rubber Company, Akron, Ohio

[21] Appl. No.: 715,739

[22] Filed: Sep. 19, 1996

[51] Int. Cl.$^6$ ..................... C08F 2/38; C08F 4/80
[52] U.S. Cl. ............. 526/160; 526/176; 526/335; 526/340; 585/18; 585/507; 585/523; 502/117; 502/153; 502/154
[58] Field of Search .................... 526/160, 173, 526/176, 190; 502/117, 153, 154, 157; 585/18, 507, 523

[56] References Cited

U.S. PATENT DOCUMENTS

| | | | |
|---|---|---|---|
| 3,400,115 | 9/1968 | Dawans et al. | 502/154 X |
| 3,631,006 | 12/1971 | Hawkins | 502/153 X |
| 3,985,677 | 10/1976 | Throckmorton et al. | 526/160 X |
| 4,338,219 | 7/1982 | Naylor | 502/154 |
| 5,502,018 | 3/1996 | Chauvin et al. | 502/154 X |

*Primary Examiner*—Fred Teskin
*Attorney, Agent, or Firm*—Alvin T. Rockhill

[57] ABSTRACT

The subject invention discloses a technique for controlling the molecular weight of synthetic polymers which are made by anionic polymerization. This invention is based upon the discovery that the molecular weight of diene polymers made by anionic polymerization utilizing organolithium initiators can be reduced by conducting the polymerization in the presence of bis(1,5-cyclooctadiene) nickel. The present invention more specifically discloses a process for producing a polymer of controlled molecular weight by anionic polymerization, said process comprising initiating the anionic polymerization of at least one conjugated diolefin monomer with an organolithium compound, wherein the polymerization is conducted in the presence of bis(1,5-cyclooctadiene) nickel. This technique is particularly useful in synthesizing liquid polymers but can also be used to reduce the molecular weight of rubbery polymers.

20 Claims, No Drawings

MOLECULAR WEIGHT REGULATOR FOR ANIONIC POLYMERIZATIONS

BACKGROUND OF THE INVENTION

Synthetic rubbers are commonly made by the anionic polymerization of conjugated diolefin monomers. For instance, polybutadiene rubber can be synthesized by initiating the polymerization of 1,3-butadiene monomer with an organolithium compound.

In some applications, it is critical for synthetic rubber to have a molecular weight which is within a specific range. The molecular weight of polymers synthesized by anionic polymerization is inversely proportional to the amount of initiator used. Thus, in cases where a low molecular weight is desired, a relatively large amount of initiator will typically be employed. However, the use of large amounts of initiator is expensive and greatly adds to the cost of producing polymers having extremely low molecular weights by anionic polymerization.

There is a need for a viable means to control the molecular weight of polymers made by anionic polymerization other than by adjustment of the initiator level. This invention relates to such a means for controlling molecular weight of polymers made by anionic polymerization.

SUMMARY OF THE INVENTION

It has been unexpectedly found that bis(1,5-cyclooctadiene)nickel acts as a molecular weight regulator for anionic polymerizations. For instance, bis(1,5-cyclooctadiene)nickel can be used to control the molecular weight of diene rubbers which are made by the polymerization of conjugated diolefin monomers using organolithium initiators. The molecular weight of the rubber produced decreases with increasing levels of the bis(1,5-cyclooctadiene)nickel.

The subject invention more specifically discloses a process for producing rubbery polymers and liquid polymers of controlled molecular weight by anionic polymerization, said process comprising initiating the anionic polymerization of at least one conjugated diolefin monomer with an organolithium compound, wherein the polymerization is conducted in the presence of bis(1,5-cyclooctadiene)nickel.

The subject invention further discloses a process for producing synthetic rubber or liquid polymers which comprises polymerizing at least one conjugated diolefin monomer in an organic solvent employing an organolithium compound as the initiator, wherein said polymerization is conducted in the presence of bis(1,5-cyclooctadiene)nickel which acts as a molecular weight regulator.

The subject invention also reveals an anionic initiator system which is comprised of (a) an organolithium compound and (b) bis(1,5-cyclooctadiene)nickel.

DETAILED DESCRIPTION OF THE INVENTION

Bis(1,5-cyclooctadiene)nickel can be utilized as a molecular weight regulator in solution polymerizations, bulk polymerizations or vapor phase polymerizations of conjugated diolefin monomers which employ organolithium initiators. However, solution polymerization is typically used to polymerize conjugated diolefin monomers into rubbery polymers using the techniques of this invention. Such solution polymerizations will normally be carried out in a hydrocarbon solvent which can be one or more aromatic, paraffinic or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene and the like, alone or in admixture.

In the solution polymerizations of this invention, there will normally be from about 5 to about 35 weight percent monomers in the polymerization medium. Such polymerization media are, of course, comprised of the organic solvent, the bis(1,5-cyclooctadiene)nickel and the monomers. In most cases, it will be preferred for the polymerization medium to contain from 10 to 30 weight percent monomers. It is generally more preferred for the polymerization medium to contain 20 to 25 weight percent monomer.

The monomers used will include at least one conjugated diolefin monomer. Conjugated diolefin monomers containing from 4 to 8 carbon atoms are generally preferred. Some representative examples of conjugated diene monomers that can be polymerized into rubbery polymers utilizing the techniques of this invention include 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene and 4,5-diethyl-1,3-octadiene. Vinyl aromatic monomers can also be copolymerized with one or more conjugated diolefin monomers into rubbery polymers or liquid polymers employing molecular weight regulators of this invention. Some representative examples of vinyl aromatic monomers that can be copolymerized with conjugated diolefin monomers in accordance with this invention include styrene, 1-vinylnaphthalene, 3-methylstyrene, 3,5-diethylstyrene, 4-propylstyrene, 2,4,6-trimethylstyrene, 4-dodecylstyrene, 3-methyl-5-normal-hexylstyrene, 4-phenylstyrene, 2-ethyl-4-benzylstyrene, 3,5-diphenylstyrene, 2,3,4,5-tetraethyl- styrene, 3-ethyl-1-vinylnaphthalene, 6-isopropyl-1-vinylnaphthalene, 6-cyclohexyl-1-vinylnaphthalene, 7-dodecyl-2-vinylnaphthalene, α-methylstyrene and the like. Some representative examples of rubbers that can be made employing the techniques of this invention include polybutadiene rubber, polyisoprene rubber, styrene-butadiene rubber (SBR), styrene-isoprene rubber (SIR), isoprene-butadiene rubber (IBR), styrene-isoprene-butadiene rubber (SIBR) and their liquid polymer counterparts.

Polymerization is started by adding an organolithium compound to the polymerization medium. Such polymerizations can be carried out utilizing batch, semi-continuous or continuous techniques. In a continuous process, additional monomer, organolithium initiator, solvent and bis(1,5-cyclooctadiene)nickel are continuously added to the reaction vessel being utilized.

The organolithium compound which can be utilized includes organomonolithium compounds and organo multifunctional lithium compounds. The organo multifunctional lithium compounds will typically be organodilithium compounds or organotrilithium compounds. Some representative examples of suitable multifunctional organolithium compounds include 1,4-dilithiobutane, 1,10-dilithiodecane, 1,20-dilithioeicosane, 1,4-dilithiobenzene, 1,4-dilithionaphthalene, 9,10-dilithioanthracene, 1,2-dilithio-1,2-diphenylethane, 1,3,5,-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl and the like.

The organolithium compounds which can be utilized are normally organomonolithium compounds. The organolithium compounds which are preferred are alkyllithium compounds which are represented by the formula: R-Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium and 4-cyclohexylbutyllithium.

As a general rule, in all anionic polymerizations, the molecular weight (Mooney viscosity) of the polymer produced is inversely proportional to the amount of initiator utilized. As a general rule, from about 0.01 to about 1 phm (parts per hundred parts of monomer by weight) of the organolithium compound will be employed. In most cases, it will be preferred to utilize from about 0.015 to about 0.1 phm of the organolithium compound with it being most preferred to utilize from about 0.025 phm to 0.07 phm of the organolithium compound.

The polymerizations of this invention are, of course, also conducted in the presence of bis(1,5-cyclooctadiene)nickel as a molecular weight regulator. The molecular weight of the rubber produced decreases with increasing levels of the bis(1,5-cyclooctadiene)nickel. Thus, the amount of bis(1,5-cyclooctadiene)nickel used will depend upon the molecular weight which is desired for the polymer being produced. In cases where only a slight reduction in molecular weight is desired, the amount of bis(1,5-cyclooctadiene)nickel employed will be relatively small. On the other hand, in cases where a substantial reduction in molecular weight is desired, the amount of bis(1,5-cyclooctadiene)nickel employed will be relatively large. In most cases, the molar ratio of bis(1,5-cyclooctadiene)nickel to the organolithium compound will be within the range of about 0.001:1 to about 1:1. Typically, the molar ratio of bis(1,5-cyclooctadiene) nickel to the organolithium compound will be within the range of about 0.01:1 to about 0.8:1. A substantial reduction in molecular weight can normally be accomplished utilizing a molar ratio of bis(1,5-cyclooctadiene)nickel to the organolithium compound will be within the range of about 0.1:1 to about 0.7:1. In cases where liquid polymers are being synthesized, the molar ratio of bis(1,5-cyclooctadiene)nickel to the organolithium compound will typically be within the range of about 0.3:1 to about 0.6:1.

The polymerization temperature utilized will typically be within the range of about −10° C. to about 150° C. It is normally preferred for the polymerization medium to be maintained at a temperature which is within the range of about 30° C. to about 100° C. throughout the polymerization. It is typically most preferred for the polymerization temperature to be within the range of about 50° C. to about 80° C. The pressure used will normally be sufficient to maintain a substantially liquid phase under the conditions of the polymerization reaction.

Polar modifiers can be used to modify the microstructure of the polymer being synthesized. Ethers and tertiary amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, N-phenyl morpholine and the like. Dipiperidinoethane, dipyrrolidinoethane, tetramethylethylene diamine, diethylene glycol, dimethyl ether, TMEDA and tetrahydrofuran are representative of highly preferred modifiers. U.S. Pat. No. 4,022,959 describes the use of ethers and tertiary amines as polar modifiers in greater detail.

The polymerization is conducted for a length of time sufficient to permit substantially complete polymerization of the monomers into polymer. In other words, the polymerization is normally carried out until high conversions are realized. The polymerization can then be terminated using a standard procedure.

The polymer produced is then recovered from the organic solvent. The polymer can be recovered from the organic solvent by standard techniques, such as decantation, filtration, centrification and the like. It is often desirable to precipitate the polymer from the organic solvent by the addition of lower alcohols containing from 1 to about 4 carbon atoms to the polymer solution. Suitable lower alcohols for precipitation of the rubbery polymer from the polymer cement include methanol, ethanol, isopropyl alcohol, n-propyl alcohol and t-butyl alcohol. The utilization of lower alcohols to precipitate the polymer from the polymer cement also "kills" the living polymer chains by inactivating lithium end groups. After the polymer is recovered from the organic solvent, steam-stripping can be employed to reduce the level of volatile organic compounds in the rubber.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1

In this experiment, bis(1,5-cyclooctadiene)nickel was synthesized utilizing a procedure which is similar to the one described on page 257 of Volume 1, P. W. Jolly, The Organic Chemistry of Nickel (1974). In the procedure used, 100 ml of a 1,5-cyclooctadiene (COD) in hexanes solution containing 14.62 g of COD was passed through a column packed with silica gel and alumina. It should be noted that the hexanes solution contained a number of different hexane isomers. In any case, after being passed through the silica gel and alumina column, the COD solution was added to an 8-ounce (237 ml) bottle under a nitrogen atmosphere. Then, 19.8 g of nickel octoate solution (10 percent by weight nickel) was added to the bottle and the solution was sparged with nitrogen to remove any dissolved air.

After the solution was sparged, 77.5 ml of a 0.87M solution of triisobutylaluminum was added. The addition of the triisobutylaluminum caused a very fast, exothermic reaction to occur. After cooling to room temperature, the soluble fraction was decanted using a transfer needle. The residue was washed twice with dry hexanes and was subsequently dried by passing a stream of dry nitrogen over it. After being dried, 5.56 g of residue was recovered which corresponds to a yield of 60 percent. The melting point of the residue was determined to be 140° C., which agrees with the literature value for bis(1,5-cyclooctadiene)nickel. Then, 0.10M solutions of bis(1,5-cyclooctadiene)nickel in toluene were made by dissolving the bis(1,5-cyclooctadiene)nickel in toluene.

EXAMPLES 2–8

In this series of experiments, polybutadiene was synthesized in the presence of various amounts of bis(1,5-cyclooctadiene)nickel utilizing normal-butyllithium as the initiator. In the procedure used, 100 ml of 20.1 weight percent solutions of 1,3-butadiene in hexane were added to a series of 4 ounce (118 ml) polymerization bottles. Then, toluene, bis(1,5-cyclooctadiene)nickel and 0.80 ml of a 0.10M n-butyllithium solutions were added with a hypodermic syringe. The bottles were then placed in a water bath which was maintained at 65° C. with the bottles being rotated end-over-end.

After the desired reaction time, shortstop solutions were added to the polymerization bottles. The shortstop solutions contained 1 phr (parts per hundred parts of monomer) of isopropanol and 1 phr of p-phenylenediamine antioxidant. The polybutadiene rubber synthesized in each of the runs was isolated by vacuum oven drying. Subsequently, the dilute solution viscosity (DSV) of the polymer samples was determined in 0.25 percent toluene solutions at 30° C. The glass transition temperatures of the polybutadiene samples made were also determined by differential scanning calorimetry.

The amount of the 0.10M solution of bis(1,5-cyclooctadiene)nickel added and the DSV of the polybutadiene samples made are reported in Table I. Bis (1,5-cyclooctadiene)nickel is abbreviated as $Ni(COD)_2$.

TABLE I

| Example | Toluene[1] | $Ni(COD)_2$ | Yield | DSV |
|---|---|---|---|---|
| 2 | 0.40 ml | — | 100% | 2.81 dl/g |
| 3 | 0.36 ml | 0.04 ml | 83% | 1.57 dl/g |
| 4 | 0.32 ml | 0.08 ml | 78% | 1.15 dl/g |
| 5 | 0.28 ml | 0.12 ml | 62% | 0.77 dl/g |
| 6 | 0.24 ml | 0.16 ml | 67% | 0.71 dl/g |
| 7 | 0.16 ml | 0.24 ml | 43% | 0.38 dl/g |
| 8 | — | 0.40 ml | 19% | 0.17 dl/g |

[1]Since toluene was used as the solvent for the bis(1,5-cyclooctadiene)nickel, make-up toluene was added so that the concentration of toluene would be the same in all of the polymerizations.

As can be seen from Table I, the DSV of the polybutadiene synthesized decreased dramatically with increasing levels of the bis(1,5-cyclooctadiene)nickel modifier. However, the microstructure of the polybutadiene did not change significantly. The polybutadiene rubber made in Example 2 as the control in the presence of no bis(1,5-cyclooctadiene)nickel had a glass transition temperature of –101° C. The polybutadiene made in Example 8 in the presence of the highest level of bis(1,5-cyclooctadiene) nickel had a glass transition temperature of –102° C. Thus, the bis(1,5-cyclooctadiene)nickel modifier had virtually no effect on the glass transition temperature of the polymer.

EXAMPLES 9–15

This series of experiments was carried out utilizing the same procedure as was employed in Examples 2–8 except for the fact that the polymerizations were conducted in the presence of N,N,N',N'-tetramethylethylenediamine (TMEDA). The TMEDA was added to the polymerization bottles by injecting 0.40 ml of 0.20M solutions of the TMEDA immediately after the bis(1,5-cyclooctadiene) nickel modifier was added to the bottles. The amount of the 0.10M solution of bis(1,5-cyclooctadiene)nickel added, the DSV of the polybutadiene samples made and polymer yields are reported in Table II.

TABLE II

| Example | Toluene[1] | $Ni(COD)_2$ | Yield | DSV |
|---|---|---|---|---|
| 9 | 0.40 ml | — | 98% | 2.85 dl/g |
| 10 | 0.36 ml | 0.04 ml | 87% | 1.31 dl/g |
| 11 | 0.32 ml | 0.08 ml | 98% | 0.84 dl/g |
| 12 | 0.28 ml | 0.12 ml | 88% | 0.65 dl/g |
| 13 | 0.24 ml | 0.16 ml | 79% | 0.55 dl/g |
| 14 | 0.16 ml | 0.24 ml | 79% | 0.48 dl/g |
| 15 | — | 0.40 ml | 64% | 0.34 dl/g |

Again, the DSV of the polybutadiene synthesized decreased dramatically with increasing levels of the bis(1,5-cyclooctadiene)nickel modifier. The TMEDA also acted very efficiently to increase the glass transition temperature of the polybutadiene. The polybutadiene made in Example 9 had a glass transition temperature of –47° C. and the polybutadiene made in Example 15 had a glass transition temperature of 57° C. The polymer yields achieved in this series of experiments was improved over the yields realized in Examples 2–8. Thus, the polar modifier appears to have improved polymer yields.

EXAMPLES 16–22

This series of experiments was carried out utilizing the same procedure as was employed in Examples 9–15 except for the fact that the amount of TMEDA added was increased to 0.80 ml. The amount of the 0.10M solution of bis(1,5-cyclooctadiene)nickel added, the DSV of the polybutadiene samples made and polymer yields are reported in Table III.

TABLE III

| Example | Toluene[1] | $Ni(COD)_2$ | Yield | DSV |
|---|---|---|---|---|
| 16 | 0.40 ml | — | 96% | 1.87 dl/g |
| 17 | 0.36 ml | 0.04 ml | 96% | 0.97 dl/g |
| 18 | 0.32 ml | 0.08 ml | 94% | 0.80 dl/g |
| 19 | 0.28 ml | 0.12 ml | 88% | 0.69 dl/g |
| 20 | 0.24 ml | 0.16 ml | 90% | 0.54 dl/g |
| 21 | 0.16 ml | 0.24 ml | 86% | 0.45 dl/g |
| 22 | — | 0.40 ml | 71% | 0.35 dl/g |

Table III shows that the DSV of the polybutadiene rubber synthesized again decreased dramatically with increasing levels of the bis(1,5-cyclooctadiene)nickel modifier. The TMEDA also acted very efficiently to increase the glass transition temperature of the polybutadiene. The polybutadiene rubber made in Example 16 had a glass transition temperature of –44° C. and the polybutadiene made in Example 22 had a glass transition temperature of –59° C. The polymer yields achieved in this series of experiments again showed an improvement over the yields realized in Examples 2–8. Thus, the polar modifier again appears to have improved polymer yields.

EXAMPLES 23–25

In this series of experiments, styrene-butadiene copolymer was synthesized using the same procedure as was employed in Examples 9–15, except for the fact that a monomer solution containing 82 percent 1,3-butadiene and 18 percent styrene was substituted for 1,3-butadiene monomer solution used in Examples 9–15. The amount of the 0.10M solution of bis(1,5-cyclooctadiene)nickel added, the DSV of the styrene-butadiene copolymer samples made and polymer yields are reported in Table IV.

TABLE IV

| Example | Toluene[1] | Ni(COD)$_2$ | Yield | DSV |
|---|---|---|---|---|
| 23 | 0.40 ml | — | 83% | 3.40 dl/g |
| 24 | 0.32 ml | 0.08 ml | 73% | 1.40 dl/g |
| 25 | 0.24 ml | 0.16 ml | 76% | 0.81 dl/g |

Table IV shows that the DSV of the styrene-butadiene rubber synthesized decreased dramatically with increasing levels of the bis(1,5-cyclooctadiene)nickel modifier. The styrene-butadiene rubber made in Example 23 had a glass transition temperature of −36° C. and the styrene-butadiene made in Example 25 had a glass transition temperature of −41° C. Thus, the bis(1,5-cyclooctadiene)nickel modifier had very little effect on the glass transition temperature of the polymer.

EXAMPLES 26–29

In this series of experiments, styrene-butadiene copolymer was again synthesized utilizing the same procedure as was employed in Examples 23–25 expect that the amount of 0.10M TMEDA solution added was increased to 0.80 ml. The amount of the 0.10M solution of bis(1,5-cyclooctadiene)nickel added, the DSV of the styrene-butadiene copolymer samples made and polymer yields are reported in Table V.

TABLE V

| Example | Toluene[1] | Ni(COD)$_2$ | Yield | DSV |
|---|---|---|---|---|
| 26 | 0.40 ml | — | 96% | 2.36 dl/g |
| 27 | 0.32 ml | 0.08 ml | 82% | 1.29 dl/g |
| 28 | 0.24 ml | 0.16 ml | 90% | 1.11 dl/g |
| 29 | — | 0.40 ml | 79% | 1.03 dl/g |

Table V shows that the DSV of the styrene-butadiene copolymer synthesized decreased dramatically with increasing levels of the bis(1,5cyclooctadiene)nickel modifier. Polymer yields also increased with the higher level of TMEDA.

EXAMPLES 30–31

In this series of experiments, polyisoprene rubber was synthesized using the same procedure as was employed in Examples 2–8, except for the fact that isoprene monomer was substituted for 1,3-butadiene monomer used in Examples 2–8. The amount of the 0.10M solution of bis(1,5-cyclooctadiene)nickel added, the DSV of the polyisoprene rubber samples made and polymer yields are reported in Table VI.

TABLE VI

| Example | Toluene[1] | Ni(COD)$_2$ | Yield | DSV |
|---|---|---|---|---|
| 30 | 0.64 ml | — | 100% | 2.06 dl/g |
| 31 | — | 0.64 ml | 84% | 0.39 dl/g |

Table VI shows that the DSV of the polyisoprene synthesized decreased dramatically with increasing levels of the bis(1,5-cyclooctadiene)nickel modifier. The polyisoprene rubber made in Example 30 had a glass transition temperature of −64° C. and the polyisoprene made in Example 31 had a glass transition temperature of −66° C. Thus, the bis(1,5-cyclooctadiene)nickel modifier had very little effect on the glass transition temperature of the polymer.

EXAMPLE 32

The technique of this invention can be used to synthesize liquid polymers having number average molecular weights of less than about 20,000. In this experiment, a liquid polybutadiene was synthesized utilizing the technique of this invention.

In the procedure used, 500 ml of a 16.5 percent 1,3-butadiene in hexane solution and 1.9 ml of a 0.085M bis(1,5-cyclooctadiene)nickel solution were charged into a 32 ounce (946 ml) polymerization bottle. Then, polymerization was initiated by charging 0.30 ml of a 1.09M solution of n-butyllithium into the polymerization bottle. The polymerization was carried out at a temperature of 65° C. for 2 hours.

The yield of liquid polybutadiene was determined to be 85 percent. The liquid polybutadiene was also determined to have a DSV of 0.51, a number average molecular weight of 17,900 and a weight average molecular weight of 42,300.

While certain representative embodiments and details have been shown for the purpose of illustrating the subject invention, it will be apparent to those skilled in this art that various changes and modifications can be made therein without departing from the scope of the subject invention.

What is claimed is:

1. A process for producing rubbery polymers and liquid polymers of controlled molecular weight by anionic polymerization, said process comprising initiating the anionic polymerization of at least one conjugated diolefin monomer with an organolithium compound, wherein the polymerization is conducted in the presence of bis(1,5-cyclooctadiene)nickel.

2. A process as specified in claim 1 wherein said anionic polymerization is carried out in bulk.

3. A process as specified in claim 1 wherein said anionic polymerization is carried out in the vapor phase.

4. A process for producing a synthetic polymer which comprises polymerizing at least one conjugated diolefin monomer in an organic solvent employing an organolithium compound as polymerization initiator, wherein said polymerization is conducted in the presence of bis(1,5-cyclooctadiene)nickel which acts as a molecular weight regulator.

5. A process as specified in claim 4 wherein said synthetic polymer is polybutadiene; and wherein said conjugated diolefin monomer is 1,3-butadiene.

6. A process as specified in claim 4 wherein said synthetic polymer is polyisoprene; and wherein said conjugated diolefin monomer is isoprene.

7. A process as specified in claim 4 which further comprises copolymerizing styrene with the conjugated diolefin monomer; wherein the conjugated diolefin monomer is 1,3-butadiene; and wherein said synthetic polymer is styrene-butadiene copolymer.

8. A process as specified in claim 4 wherein said synthetic polymer is a isoprene-butadiene copolymer; and wherein said conjugated diolefin monomer is a mixture of isoprene monomer and 1,3-butadiene.

9. A process as specified in claim 4 wherein the organolithium compound is an alkyllithium compound which contains from 1 to about 10 carbon atoms.

10. A process as specified in claim 9 wherein the molar ratio of the bis(1,5-cyclooctadiene)nickel to the alkyllithium compound is within the range of about 0.001:1 to about 1:1.

11. A process as specified in claim 10 wherein the polymerization is conducted at a temperature which is within the range of about −10° C. to about 150° C.

12. A process as specified in claim 11 wherein the organic solvent is selected from the group consisting of aromatic, paraffinic and cycloparaffinic compounds containing from 4 to 10 carbon atoms which are liquids under the conditions of the polymerization.

13. A process as specified in claim 12 wherein the polymerization is conducted in a polymerization medium which contains from about 5 weight percent to about 35 weight percent monomers.

14. A process as specified in claim 13 wherein the molar ratio of the bis(1,5-cyclooctadiene)nickel to the alkyllithium compound is within the range of about 0.01:1 to about 0.8:1.

15. A process as specified in claim 14 wherein the polymerization is conducted at a temperature which is within the range of about 30° C. to about 100° C.

16. A process as specified in claim 15 wherein the molar ratio of the bis(1,5-cyclooctadiene)nickel to the alkyllithium compound is within the range of about 0.1:1 to about 0.7:1.

17. A process as specified in claim 14 wherein the polymerization is conducted at a temperature which is within the range of about 50° C. to about 80° C.

18. A process as specified in claim 17 wherein the molar ratio of the bis(1,5-cyclooctadiene)nickel to the alkyllithium compound is within the range of about 0.3:1 to about 0.6:1.

19. An anionic initiator system which is comprised of (a) an organolithium compound and (b) bis(1,5-cyclooctadiene)nickel.

20. An anionic initiator system as specified in claim 19 wherein the molar ratio of the bis(1,5-cyclooctadiene)nickel to the organolithium compound is within the range of about 0.001:1 to about 1:1.

* * * * *